Nov. 11, 1958   HENRI-GEORGES DOLL   2,859,916
AUTOMATIC COMPUTING APPARATUS

Filed June 2, 1953   3 Sheets-Sheet 1

INVENTOR.
HENRI GEORGES DOLL
BY Robert Hockfield
HIS ATTORNEY

Nov. 11, 1958     HENRI-GEORGES DOLL     2,859,916
AUTOMATIC COMPUTING APPARATUS

Filed June 2, 1953     3 Sheets-Sheet 3

INVENTOR.
HENRI GEORGES DOLL
BY Robert Hockfield
HIS ATTORNEY

United States Patent Office 2,859,916
Patented Nov. 11, 1958

2,859,916

AUTOMATIC COMPUTING APPARATUS

Henri-Georges Doll, Ridgefield, Conn., assignor, by mesne assignments, to Schlumberger Well Surveying Corporation, Houston, Tex., a corporation of Texas Application June 2, 1953, Serial No. 359,197

15 Claims. (Cl. 235—61)

This invention relates to automatic computing apparatus and, more particularly, pertains to certain improvements in computers of the type providing a signal continuously representative of the value of a specified function of a plurality of independent variables in response to signals dependent upon these variables.

One prior art computer of the above-defined type includes a screen inscribed with a family of curves representing the function $z=f(x, y)$. The curves on the screen are intercepted by the sweep trace of a cathode ray tube, the trace extending between the points $x=0$, $y=0$ and a point corresponding to the instantaneous values of $x$ and $y$. Thus, the sweep trace has a length and angular orientation dependent upon $x$ and $y$ and by means of a photoelectric cell and an integrator, the light pulses corresponding to the number of curves intercepted by the trace are counted, thereby indicating the instantaneous value of $z$.

To provide the sweep trace in this prior art computer, an alternating potential is supplied to the two sets of deflection elements of the cathode ray tube via respective variable-gain amplifiers. The amplification of each amplifier is controlled in accordance with the instantaneous values of one of the variables $x$ and $y$. It is at once apparent that one of the requirements imposed on the amplifiers is difficult to meet; i. e., the amplification of each amplifier must vary in an exact predetermined relation with respect to variations in a corresponding one of the independent variables over the entire operating range of values. Consequently, accurate computations may not be possible throughout the desired operating range.

It is an object of the present invention, therefore, to provide improved automatic computing apparatus of the type in which a signal is derived continuously representative of the value of a specified function of a plurality of independent variables, affording greater accuracy in computation than heretofore possible.

Another object of the present invention is to provide improved computing apparatus which is relatively simple to construct and yet is entirely efficient and accurate in operation.

Yet another object of the present invention is to provide improved computing apparatus which is ideally suited for association with electrical well logging apparatus.

An automatic computer embodying the present invention comprises a screen including a general background area having a given effect on incident radiant energy and a family of curves having a different effect on incident radiant energy. A beam of radiant energy is projected toward the screen and means are provided for relatively and recurrently displacing the screen and the beam in an essentially fixed angular direction thereby to scan a path along the screen and effect modulation of the beam. The screen and the beam are positioned in two directions with respect to one another according to the instantaneous values of respective ones of two variable quantities and thereby control the modulation of the beam. The computer further includes means for deriving an electrical signal having a characteristic representing the aforesaid modulation.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
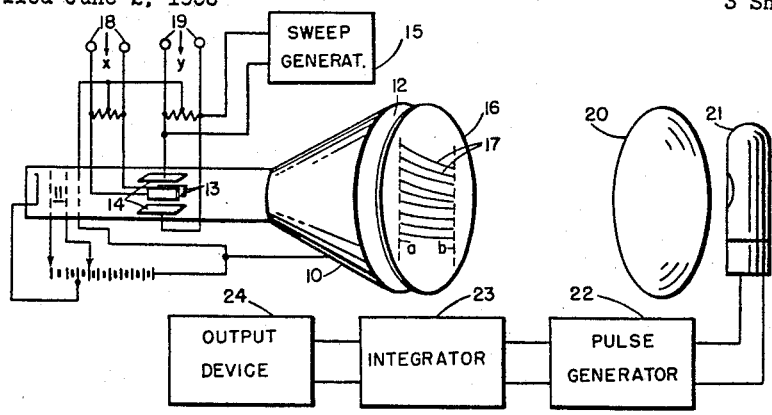
Fig. 1 is a schematic diagram, partly in block form, of an automatic computer constructed in accordance with the present invention.

In Fig. 1 of the drawings there is illustrated an automatic computer constructed in accordance with the present invention. It comprises a cathode ray tube 10 provided with the usual electrode system 11 adapted to form and project a beam of electrons toward a fluorescent screen 12. The electron beam is under the control of a deflection system which includes a pair of horizontal deflection plates 13 and a pair of vertical deflection plates 14. Of course, deflection coils may be suitably employed in place of the deflection plates.

The electron beam from electrode system 11 is focussed in a small spot on fluorescent screen 12, thereby producing a corresponding beam of radiant energy, preferably having a frequency in the visible portion of the spectrum. A sweep generator 15 is coupled to vertical deflection plates 14 and supplies thereto a voltage wave of triangular form. Thus, a sweep trace of light energy is developed on fluorescent screen 12.

The automatic computer further includes a transparent screen 16 inscribed with a family of opaque curves 17. The transparent portion of screen 16 thus represents a general background area having a given effect on incident radiant energy, i. e., it passes with substantially no attenuation incident light energy. Since family of curves 17 are opaque, they have a different effect, that is, they attenuate, incident light energy. Screen 16 is positioned adjacent fluorescent screen 12 so that the beam of light energy in the sweep trace of the fluorescent screen is projected toward the curve-carrying screen 16. The curves 17 may, for example, represent successive values of a dependent variable plotted in terms of two-coordinate values of two independent variables.

Since the spot of light on fluorescent screen 12 is periodically displaced in accordance with the sweep wave from generator 15, it is evident that the light beam and screen 16 are relatively and recurrently displaced in an essentially fixed angular direction, thus the screen is recurrently scanned with light energy in a direction that is always vertical.

In order to introduce the values of independent variables $x$ and $y$, voltages having a characteristic, such as amplitude, representative of the instantaneous values of variables $x$ and $y$ are applied to terminals 18 and to terminals 19, respectively. Terminals 18 are connected to horizontal deflection plates 13, while terminals 19 are connected to vertical deflection plates 14. Accordingly, the electron beam within cathode ray tube 10, as well as the resulting light beam from its fluorescent screen 12, are positioned in translation relative to screen 16 in response to the values of the independent variables. The number of curves 17 intercepted by the sweep trace during recurrent scanning intervals thus is determined, thereby establishing a corresponding number of light energy pulsations.

Light energy modified by screen 16 is gathered by a condensing lens 20 and concentrated on a photoelectric cell 21. Cell 21 generates a number of electrical impulses corresponding to the number of incident light impulses and its output synchronizes a pulse generator 22 which supplies corresponding electrical pulses of fixed amplitude and duration to an integrator 23. Integrator 23 counts the number of electrical pulses applied thereto with respect to time and derives an electrical signal having an amplitude representing that number, and an output device 24, such as a voltmeter, provides continuous indications of that number.

Elements 15, 22, 23 and 24 all may be of conventional construction and, hence, a detailed description thereof is deemed unnecessary.

Figure 2:
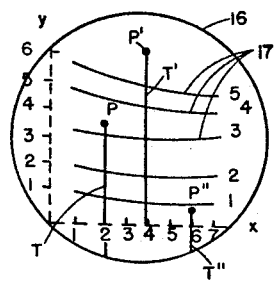
Fig. 2 is a representation of a set of exemplary curves which are useful in explaining the operation of the computer shown in Fig. 1.

In explaining the operation of the computer just described, reference is made to Fig. 2 which illustrates screen 16. For convenience, an $x$—$y$ reference coordinate axes system with assigned values of $x$ and $y$ has been drawn. In addition, the several curves 17 have been assigned individual values.

Let it first be assumed that the instantaneous values of $x$ and $y$ are 2 units and 3.5 units, respectively. The corresponding voltages applied to terminals 18 and 19, and thus impressed on deflection system 13—14, cause the sweep trace of light on viewing screen 12 to appear as line T (in Fig. 2) whose upper extremity $p$ is located at the point $x=2$, $y=3.5$. For this condition, sweep trace T intercepts those of curves 17 designated 1, 2 and 3. Thus, during each one-half of the triangular sweep, three light interruptions, and three corresponding electrical impulses are generated. Accordingly, during each recurrent scan, integrator 23 counts six electrical pulses and output device 24 is suitably adjusted to indicate a reading of three units in response to the voltage supplied by integrator 23.

It is, of course, apparent that if a saw-tooth sweep, rather than a triangular sweep of equilateral form, is employed, the same number of impulses as the number of curves intercepted is derived. However, it has been found in practice that a triangular wave of equilateral form having greater amplitude stability and better linearity than a saw-tooth wave can be derived through the use of conventional circuits without unduly complicating the equipment. Thus, to accommodate the triangular wave, output device 24 is calibrated to provide a reading equal to one-half the number of impulses counted by integrator 23 in each scanning interval.

In the following operating interval to be considered, it is assumed that the values of $x$ and $y$ are 4 and 6 units, respectively. The sweep trace is displaced in translation to position T' with its upper extremity at point $p'$ corresponding to $x=4$ and $y=6$. Trace T' intercepts the entire family (five) of curves 17; thus, ten electrical impulses are counted by integrator 23 in each recurrent scanning interval and output device 24 produces an indication of five units.

In the final operating interval to be considered, the instantaneous values of x and y are 6 and 0.5 units, respectively. The trace thus is displaced in translation to the position represented at T'' with its upper extremity $p''$ at the corresponding values for $x$ and $y$. It is evident that for this condition none of the curves in family 17 are intercepted by the sweep trace, no electrical impulses are produced, and integrator 23 produces zero output. That value of dependent variable z is indicated by device 24.

It is thus evident that the computed illustrated in Fig. 1 accurately makes computations for the relationship $z=f(x, y)$ represented by the curves 17 of screen 16. Obviously, various mathematical or empirically derived functions may be utilized merely by providing a suitably inscribed screen. In setting up the function for computation, the following requirements should be observed. The voltage from sweep generator 15 should be great enough in amplitude so that the sweep trace always extends between the $x$, $y$ point and a point beyond one of the family of curves bearing a minimum value. In other words, the trace should be of sufficient length that it can intercept all members of the curve family where required for certain values of the indepedent variables. Furthermore, the sweep trace should never intercept the same curve or curves more than once. The latter condition may be fulfilled by suitably orienting screen 16 relative to fluorescent screen 12 or by suitably orienting the sweep trace by applying the output of sweep generator 15 to both the vertical and horizontal deflection plates 13 and 14 in proper proportions.

Preferably, the sweep trace should intercept the several curves at obtuse angles for best definition or resolution and accuracy of computation. Of course, to increase accuracy, the number of curves employed in family 17 may be increased to the point limited by the size of the light spot formed on fluorescent screen 12. That is, the light spot should be of a diameter smaller than the width of the curve lines so that light energy to photocell 21 may be completely interrupted. This provides output pulses from the photocell of greatest amplitude and assures accurate operation.

If no manner of orientation can be achieved whereby the same curve is never intercepted more than once, such as may occur for a family of circles, the family may be divided into two groups and separately evaluated. A system for providing this result is disclosed and claimed in the copending application of H. G. Doll, filed June 2, 1953, Serial Number 359,196, entitled "Automatic Computing Apparatus."

In order to calibrate the computer of Fig. 1, it is preferable that curve lines 17 terminate at imaginary lines drawn parallel to the direction of sweep. For purpose of illustration, these imaginary lines have been represented in Fig. 1 by vertical dash lines $a$ and $b$ at the left and right extremities of curve family 17.

In the first step of the adjustment procedure, a unidirectional potential is applied to terminals 18 of a magnitude normally expected to deflect the sweep trace to a horizontal position in coincidence with the imaginary line $a$ (to the left of curve family 17) and a unidirectional potential of maximum expected value is applied to terminals 19 corresponding to a condition of vertical deflection in which all curves are intercepted by the sweep trace. The beam centering control (not shown) for horizontal plates 13 is then adjusted until output device 24 jumps from approximately zero to essentially fullscale deflection. This occurs as the sweep trace moves from the left to the right of imaginary line $a$.

In the following step, the same potentials are maintained at terminals 18 and 19 and the centering control (not shown) for vertical deflection plates 14 is adjusted until the output device 24 reads a maximum value. This corresponds to a condition of vertical deflection in which a maximum number of curves 17 are intercepted by the sweep trace.

Next, a horizontal potential of the largest expected value is applied to terminals 18, while the same vertical potential stated above is employed. The horizontal gain control (not shown) is adjusted until meter 24 reads zero. The control is further adjusted for a maximum reading, thereby indicating that all of curve lines 17 are intercepted by the sweep trace along imaginary line $b$.

Finally, using potentials at terminals 18 and 19 of magnitudes expected to provide a particular output reading, the horizontal gain control (not shown) is adjusted until the desired reading is obtained.

Thus, with the simple expedient of terminating the curve lines at imaginary lines, the computer may be properly adjusted and no special alignment screen is required.

Figure 3:
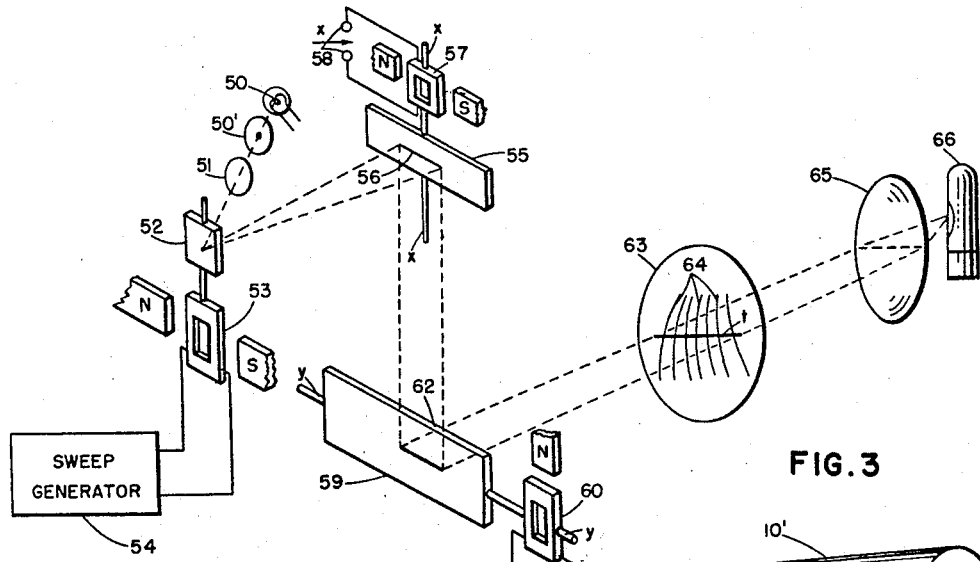
Figs. 3 and 4 represent modifications which may be made in the apparatus shown in Fig. 1.

In the modified arrangement shown in Fig. 3, electromechanical means are employed in place of the cathode ray tube 10 illustrated in Fig. 1. A source of light 50 provides light energy which is projected through a small opening in an opaque disc 50', concentrated by a lens 51 and projected in a beam toward a mirror 52 that is mechanically connected to a galvanometer coil 53. A sweep generator 54 supplies an electrical current to coil 53 and the coil as well as mirror 52 are recurrently deflected, thereby effecting recurrent scanning of light energy.

Light energy from mirror 52 is intercepted by an elongated mirror 55 positioned so that the axis of the line scan of light energy traverses a line 56 parallel to the longest dimension of the mirror. Mirror 55 is mechanically coupled with a galvanometer coil 57 to the input terminals 58 of which a voltage proportional to the instantaneous value of independent variable $x$ is applied. Light is reflected from mirror 55 toward another elongated mirror 59 mechanically coupled with still another galvanometer coil 60. Mirror 59 and coil 60 are rotatable about an axis $y$—$y$ perpendicular to the axis $x$—$x$ of mirror galvanometer 55, 57. A voltage proportional to the instantaneous value of independent variable $y$ is applied to terminals 61 of coil 60.

The trace of the beam axis of light energy reflected by mirror 55 traverses a line 62 on mirror 59 having a position parallel to the rotational axis $y$—$y$, but dependent upon the angular orientation of mirror 55 about axis $x$—$x$. Light energy is reflected by mirror 59 toward a screen 63, constructed of a transparent material inscribed with opaque curves 64. Thus, a line trace $t$ is developed on screen 63 and the position of the trace is dependent upon the voltage at terminals 58 as well as the voltage at terminals 61. Light modified by screen 63 is concentrated by a lens 65 on a photoelectric cell 66 which may be electrically coupled to pulse generator 22 of Fig. 1 in place of photocell 21.

By providing optical paths between the mirrors 52, 55 and 62 and screen 63 of sufficient length and suitable lenses, and/or suitably curved mirrors, a line trace $t$ is formed on screen 63 of at least a given length and preferably of essentially constant length. It should be noted that during certain operating intervals the trace may sweep beyond the periphery of screen 63. In this case, the length which remains constant includes both the portion on and an imaginary portion off of the screen. The position of the trace $t$, of course, is dependent upon the instantaneous values of variables $x$ and $y$. This determines the number of curves 64 which are intercepted by the trace and a corresponding number of light pulses are generated in a manner similar to that described in connection with the apparatus of Fig. 1.

Optical elements of known construction may be utilized to direct the light energy, as required. It is to be understood that these details have been omitted in Fig. 3 to facilitate the explanation thereof.

Obviously, galvanometer 52, 53 may be omitted and the signal from sweep generator 54 may be applied to terminals 58 of galvanometer 56, 57.

Although the computers of Figs. 1 and 3 have been shown to include transparent screens inscribed with opaque curves, obviously opaque screens having transparent curves may be employed. In the latter case, the diameter of the light spot projected toward the curve-carrying screen should preferably be smaller than the spacing between the closest, adjacent curve line.

Alternatively, the curves may be plotted with a material of a given reflectivity on a screen having a different reflectivity and the resulting light pulses may be reflected to a photocell.

Figure 4:
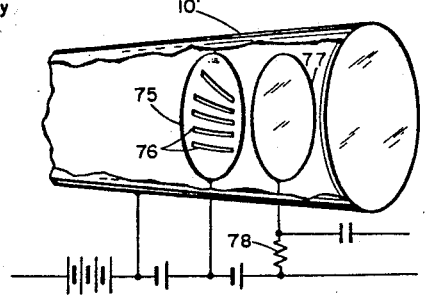

In the arrangement of Fig. 4, a modified type of cathode ray tube 10' is employed. Instead of a fluorescent screen, a conductive screen 75 is disposed within the envelope of the tube 10'. Screen 75 is provided with a family of curves in the form of slots or openings 76. The electron beam of tube 10' is projected toward screen 75 and when the beam is positioned to project through any of the slots 76, electrons are intercepted by a collector electrode 77. Otherwise, essentially no electrons reach the collector.

As in the arrangement of Fig. 1, the electron beam is recurrently scanned and its position is continuously under the control of voltages which are representative of the instantaneous values of variables $x$ and $y$. Thus, screen 75 and the electron beam are relatively and recurrently displaced in an essentially fixed angular direction, thereby effecting recurrent scanning of the screen with radiant energy. Since the screen includes a general background area of conductive material and a family of curves of non-conductive material having a different effect on incident radiant energy, electrical pulses are developed in a load resistor 78 for collector electrode 77 in response to the interception of the electron beam by the curves 76. Accordingly, a number of electrical pulses are derived at load 78 dependent upon the instantaneous values of the independent variables. These electrical pulsations may be fed to a pulse generator such as the one designated 22 in Fig. 1.

Of course, screen 75 may be replaced by a modified screen on which curves 76 are plotted as lines of secondary-electron-emitting material. Thus, a collector electrode may be disposed within the tube 10' to derive pulses representing the interceptions of the curve lines by the electron beam sweep.

Figure 5:
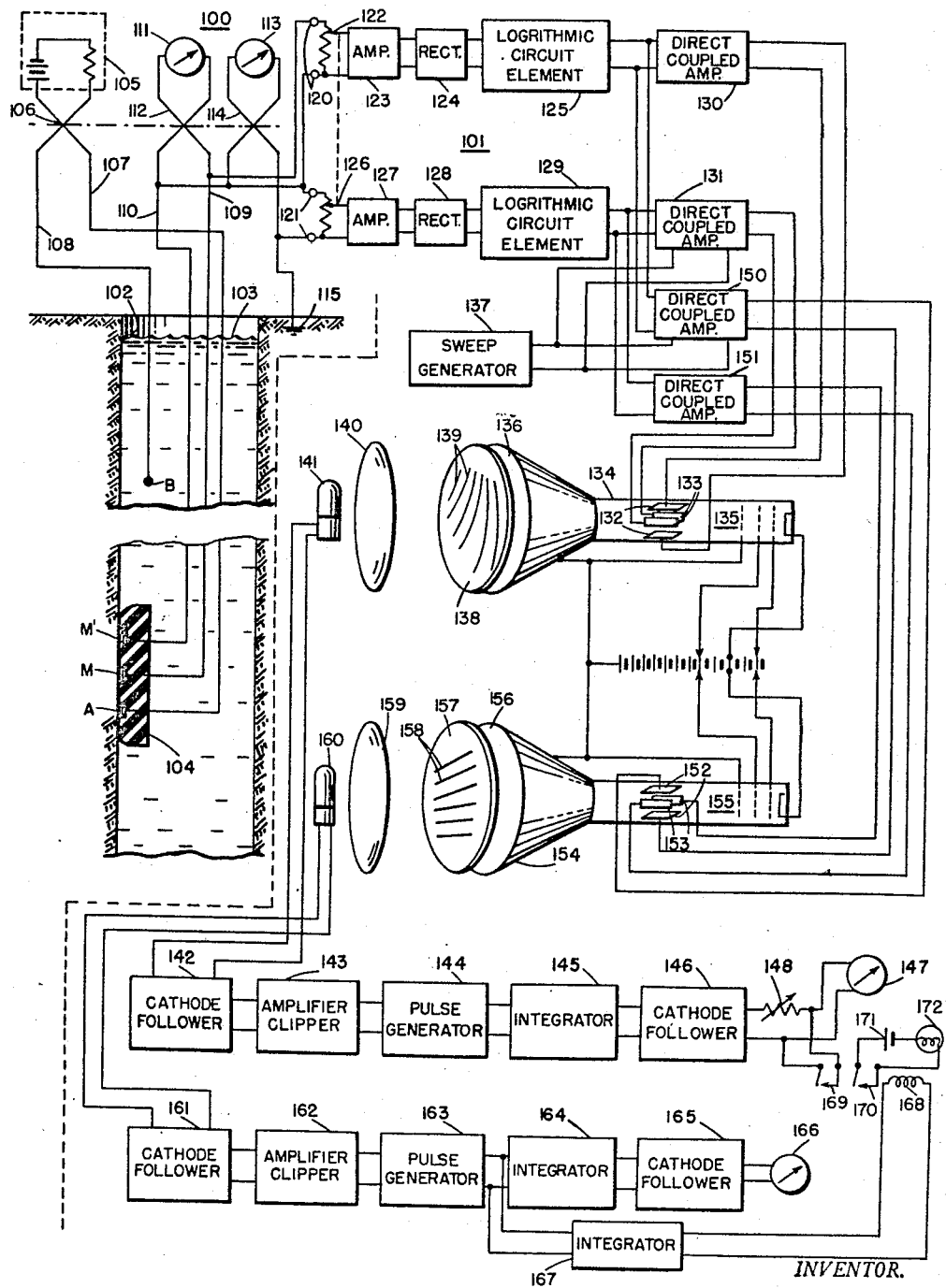
Fig. 5 illustrates a computer of the type shown in Fig. 1 represented in association with electrical well logging apparatus.

In Fig. 5 of the drawings, there is shown electrical resistivity well logging apparatus 100 utilized in association with an automatic computer 101 embodying the features of the computer represented in Fig. 1.

Logging apparatus 100 may be of the type disclosed in the copending application of H. G. Doll, Serial Number 122,102, filed October 18, 1949, entitled "Apparatus for Obtaining Indications of Permeable Formations Traversed by a Borehole." On February 16, 1954, this application matured into Patent No. 2,669,690. Generally stated, this type of logging equipment includes electrical measuring means providing resistivity determinations corresponding to two depths of lateral investigation close to the sidewall of a borehole 102 filled with a conductive drilling fluid 103, such as a water base mud. Through the use of these two different depths of investigation, the porosity of the earth formations traversed by the borehole may be derived together with a determination of mud cake thickness.

Each resistivity measurement is a function of the resistivity of the mud cake and of the mud filtrate as well as of the thickness of the mud cake and the porosity of the formation. However, the resistivity of the mud cake and mud filtrate for a given mud and a given depth will be known or may be determined. Thus, the two unknowns are porosity and mud cake thickness which may be determined from the two independent resistivity measurements. This is accomplished by making certain computations based on the electrical resistivity measurements and a computer embodying the present invention is ideally suited for making such computations.

Logging apparatus 100 comprises a pad or shoe 104 adapted to transverse borehole 102 and maintained in engagement with the sidewall thereof by a spring arrangement (not shown), for example of the type illustrated in the last-mentioned Doll application. Imbedded in pad 104 are three, closely-spaced electrodes A, M and M'. A fourth electrode B is positioned at a substantial distance above pad 104, but is arranged for concurrent movement therewith in borehole 102.

A source of constant current 105 is connected to the input circuit of a conventional polarity-reversing commutator 106, in turn, connected via leads 107 and 108 to electrodes A and B. Thus, as the system of electrodes traverses borehole 102, a constant current flows between electrodes A and B via the sidewall of borehole 102 and the adjacent earth formations.

In order to perform electrical resistivity measurements, electrodes M and M' are connected by leads 109 and 110 to an indicator 111 via a polarity-reversing commutator 112 that is synchronized with commutator 106. Thus, a unidirectional potential is applied to indicator 111 which, for example, may be a recording voltmeter.

Logging apparatus 100 includes another indicator 113 supplied with a unidirectional potential derived by another synchronized polarity-reversing commutator 114 from the voltage appearing between electrode M' and a ground return 115 located at the surface of the earth.

As explained in the last-mentioned Doll application, current flow into the formations from electrode A produces a potential difference between the electrodes M and M' which is a function of the resistivity of the formation in a zone close to the sidewall of the borehole 102 and thus is influenced to a great extent by the presence or absence of a mud cake which may form on the wall. On the other hand, the potential difference between electrode M' and ground 115 at the surface of the earth is a function of the resistivity of the material at a greater lateral distance from electrode A. The latter potential, therefore, is less influenced by the presence or absence of mud cake on the wall of the borehole.

It has been found that the amount of filtrate from the drilling fluid contained in a permeable earth formation is related to the porosity of that formation. Consequently, the electrical conductivity, or resistivity, of the zone invaded by the electrically conductive drilling fluid is dependent upon the relative porosity of the formation.

While the presence of a mud cake indicates the occurrence of a permeable earth formation, its electrical resistivity affects the resistivity determination of the invaded zone. Accordingly, the resistivities for the two depths of investigation indicated by meters 111 and 113 are required to compute the relative porosity of permeable formations traversed by borehole 102 from data of empirical origin.

To perform this computation automatically, the potential differences between electrodes M and M' and between electrodes M' and ground 115 are supplied to input terminals 120 and 121 of computer 101. These voltages have respective magnitudes dependent upon the instantaneous values of two independent variables, i. e., the electrical resistivities for two depths of investigation.

The voltage at terminals 120 is applied via a potentiometer 122 to an amplifier 123, in turn, coupled to a rectifier 124. The output of rectifier 124 is supplied to a logarithmic circuit element 125 which may be of any well-known construction for producing an output signal having an amplitude logarithmically related to the amplitude of the applied input signal. The reason for utilizing such a non-linear circuit element will be apparent from the discussion to follow.

The voltage at terminals 121 is applied over a potentiometer 126 to a similar arrangement of stages including an amplifier 127, a rectifier 128, and a logarithmic circuit element 129.

The outputs of logarithmic circuit elements 125 and 129 are supplied over respective direct-coupled amplifiers 130 and 131 to vertical deflection plates 132 and horizontal deflection plates 133, respectively, of a cathode ray tube 134. Tube 134 includes the usual electron-beam-forming electrodes 135 for projecting an electron beam toward a fluorescent screen 136. A sweep generator 137 coupled to an intermediate stage of direct coupled amplifier 131 (for isolation purposes) causes the electron beam recurrently to sweep over fluorescent screen 136 and the position of the sweep trace is under the control of the potentials supplied to terminals 120 and 121.

A transparent screen 138 provided with a family of opaque curves 139 is positioned adjacent fluorescent screen 136 and light modified by screen 138 is directed by a lens 140 toward a photoelectric cell 141. The derived electrical pulses from photocell 141 are applied to a cathode follower 142 whose output circuit is coupled to an amplifier-clipper stage 143. In stage 143 the applied pulses are amplified and clipped or amplitude-limited so that the resulting pulses applied to a synchronized pulse generator 144 are of essentially constant amplitude. Pulses of fixed duration from generator 144 are counted relative to time by an integrator 145 and the resulting potential from integrator 145 is applied via a cathode follower 146 to an output voltmeter 147 having in series therewith an adjustable resistor 148.

The portion of the automatic computer 101 thus far described may, for example, be employed to provide indications at meter 147 regarding the relative porosity of the earth formations traversed by the electrodes of logging system 100. To that end, the curves 139 represent successive values of percent porosity, a dependent variable, plotted in terms of two independent variables. The independent variables are the resistivities for the two depths of investigation individually divided by the resistivity of the mud cake. This latter quantity may be derived in a known manner and introduced into the computations by positioning the movable contacts of potentiometers 122 and 126. Preferably, these contacts are ganged for simultaneous operation and are mechanically connected to a pointer and scale arrangement (not shown) suitably calibrated in terms of mud cake resistivity.

The desired family of porosity curves in certain applications has been found to include adjacent curves so closely spaced in given range as to be beyond the definition or resolution of the apparatus. To alleviate this problem, the curves are plotted to logarithmic scales thereby increasing the relative spacing and the sweep trace which intercepts the curve family 139 is displaced in logarithmic relationship relative to the potentials at terminals 120 and 121 by reason of the inclusion of logarithmic circuit elements 125 and 129.

It has been found desirable to include in the porosity calculations a factor dependent upon the resistivity of the mud filtrate divided by the resistivity of the mud cake. This determination may be made from mud resistivity measurements and other information in a known manner and introduced to the computer by adjustment of variable resistor 148, which may be suitably calibrated for this purpose.

The operation of the portion of the computer thus far described is essentially the same as presented in connection with Fig. 1 and hence a detailed description is not needed. Briefly, as electrodes A, M, M' and B traverse borehole 102, potentials are derived at terminals 120 and 121 representing the resistivity for two depths of investigation. These variables control the position of the sweep trace produced by cathode ray tube 134 and which intercepts family of curves 139 so that the resulting light pulses at photocell 141 and the derived electrical pulses from generator 144 are dependent in number upon these variable potentials. The pulses are counted by integrator 145 and porosity indications may be derived by meter 147 which is suitably calibrated for this purpose.

In order to compute mud cake thickness from the resistivity measurements derived by measuring apparatus 100, the output signals of logarithmic circuit elements 125 and 129 are applied via respective direct-coupled amplifiers 150 and 151 to vertical deflection plates 152 and horizontal deflection plates 153, respectively, of another cathode ray tube 154. Like tube 134, it includes an electron-beam-forming electrode system 155 for projecting a beam of electrons toward a fluorescent screen 156, and a transparent screen 157 inscribed with an opaque family of curves 158 is disposed adjacent fluorescent screen 156. The curves 158 are obtained empirically and represent successive values of mud cake thickness plotted in terms of the independent variables of curve family 139.

The output of sweep generator 137 is supplied to an intermediate stage of direct-coupled amplifier 150 and thus a vertically-directed sweep or light trace is derived on fluorescent screen 156, its position, of course, being under the control of the potentials at terminals 120 and 121. As in the case of screen 138, curves 158 are plotted to logarithmic scales to avoid crowding of adjacent curves.

Modified light from screen 157 is directed by a lens 159 to a photoelectric cell 160 electrically coupled to a signal chain including in cascade relation, and in the following-named order, a cathode follower 161, an amplifier-clipper 162, a synchronized pulse generator 163, an integrator 164, a cathode follower 165, and an output meter 166. The elements 161 through 166 correspond to similarly-named elements 142 through 147 in the porosity channel.

The operation of this portion of the computer is essentially the same as that described in connection with cathode ray tube 134 with the exception that instead of a horizontal sweep trace, the sweep trace on fluorescent screen 156 is essentially always vertically directed. This direction is utilized because the orientation of the empirically-derived curves 158 dictates a vertical sweep trace to effect interception of the several curves at obtuse angles to assure high accuracy in the computations.

The sweep trace intercepts a number of the curves 158 determined by the potentials at terminals 120 and 121 and the corresponding number of electrical pulses from generator 163 is supplied to integrator 164. The output potential of integrator 164 has a magnitude related to mud cake thickness and output meter 166 may be calibrated to read mud cake thickness directly, for example, in inches.

As has been pointed out hereinbefore, the presence of a mud cake is dependent upon the existence of a permeable earth formation. If no mud cake exists opposite a particular earth formation, it may be surmised that the formation is impermeable and there is no invasion by mud filtrate. Since the determination of porosity requires the presence of invasion, porosity indications provided by output meter 147 are of questionable value when the thickness of the mud cake is substantially zero. Accordingly, means are provided for disabling indicator 147 when the mud cake thickness drops below a predetermined value.

An integrator 167 is coupled to the output circuit of pulse generator 163 and when the pulses from this generator occur at a rate slower than a predetermined value, for example, when the pulses are entirely absent, integrator 167 causes a relay coil 168 to be energized thereby closing its two sets of contacts 169 and 170. Contacts 169 are in parallel relation with meter 147 and effectively short-circuit the meter for the predetermined operating condition and contacts 170 are in series circuit relation with a battery 171 and an indicator light 172 so that light 172 is energized at the same time meter 147 is short-circuited.

It is thus apparent that when the potentials at terminals 120 and 121 have such values that the sweep trace produced on fluorescent screen 156 of cathode ray tube 154 does not intercept any of curves 158, no light impulses are supplied to photoelectric cell 160 and hence no electrical impulses are generated by generator 163. In the presence of impulses, integrator 167 maintains coil 168 in a de-energized condition, however, in the absence of impulses, integrator 167 causes energization of coil 168, thereby disabling output meter 147 and porosity indications for impermeable beds are avoided.

The following elements, shown in box form in Fig. 5, may be of conventional construction: amplifiers 123 and 127, rectifiers 124 and 128, logarithmic circuit elements 125 and 129, direct-coupled amplifiers 130, 131, 150 and 151, sweep generator 137, cathode followers 142, 146, 161 and 165, amplifier-clippers 143 and 162, pulse generators 144 and 163 and integrators 145 and 164.

Since rectifiers 124 and 128 precede logarithmic circuit elements 125 and 129, contact potentials existing in conventional rectifier circuits may cause serious errors in computation. This is understandable because elements 125 and 129 exhibit the greatest amplification for signals of minimum amplitude and contact potential values are usually of small magnitude.

Figure 6:
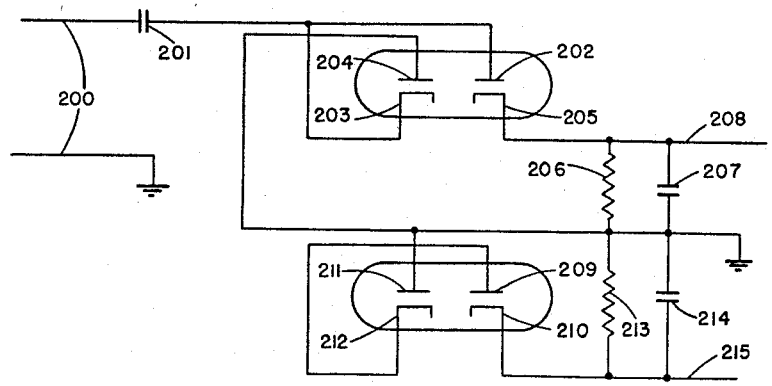
Figs. 6 and 7 are detailed circuit diagrams of portions of the computer shown in Fig. 5.

To minimize contact potential problems in rectifiers 124 and 128, a circuit such as illustrated in Fig. 6 may be employed. The output of amplifier 123 is supplied over leads 200, one of which is grounded and the other of which is coupled via a coupling condenser 201 to the anode 202 of a first diode rectifier and to the cathode 203 of a second diode rectifier. These diodes may be of the electron discharge variety included within a common evacuated envelope. Anode 204 of the second diode is grounded and the cathode 205 of the first diode is connected to one end of an output circuit comprising a load resistor 206 and a charging condenser 207. The other extremity of the output circuit 206—207 is grounded.

The portion of the circuit thus far described operates as a conventional voltage-doubling rectifier. During the portions of each operating cycle in which a positive potential is applied over condenser 201, diode 202, 205 is conductive and a positive potential appears at an output lead 208 with respect to ground. On the negative portions of each operating cycle, diode 203—204 is conductive thereby providing a charge on condenser 201 which is added to the potential applied to diode 202, 205 on the succeeding portion of each operating cycle. Condenser 207 is charged during positive portions of each cycle and a voltage appears at lead 208 of unidirectional form and equal in magnitude to the peak-to-peak value of the alternating potential applied over leads 200.

The circuit also includes a second similar pair of diodes, 209, 210 and 211, 212 connected in a circuit identical to the first pair of diodes. Anode 211 of one diode is grounded and its cathode 212 is connected to anode 209 of the other diode. The cathode 210 of the latter diode is connected to ground through an output circuit including a load resistor 213 connected parallel with a condenser 214. Cathode 210 is also connected to an output lead 215.

In operation it is assumed that similar contact potentials are developed by each of the two pairs of diodes and consequently, these contact potentials are balanced in output circuits 206—207, 213—214 and no output potential appears between output leads 208, 215 due to contact potential. In the usual operating conditions, since no alternating potential is applied to diodes 209—212, lead 215 is effectively at ground potential and the rectified output due to diodes 202, 205 appears between leads 215 and 208. This output potential may be applied to logarithmic circuit element 125 of Fig. 5.

Figure 7:
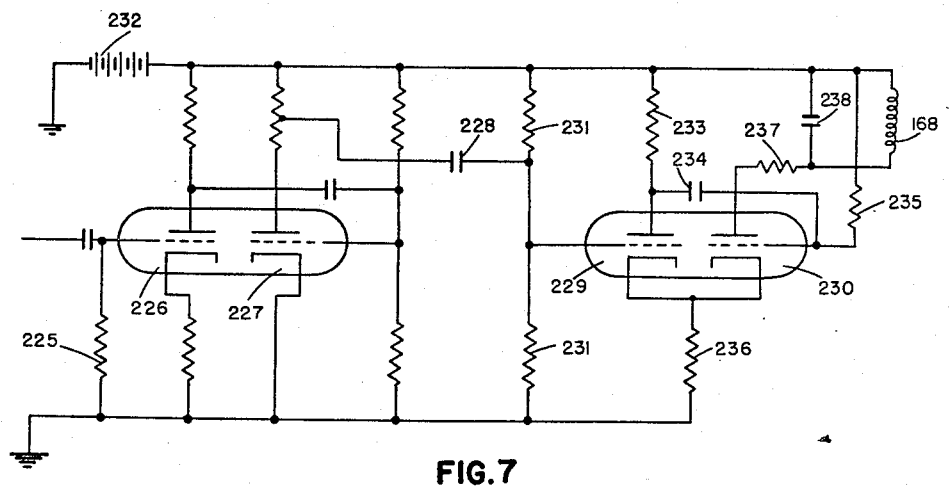

In Fig. 7, there is illustrated an integrator circuit which may be employed as integrator 167 of Fig. 5. Output from pulse generator 163 is supplied over leads 225 to the input circuit of a first amplifier including a triode-type electron discharge device 226 connected in cascade with a second amplifier including another triode electron discharge device 227. A selected portion of the output of the amplifier including triode 227 is applied over a coupling condenser 228 to a multivibrator which comprises triodes 229 and 230. The control electrode of triode 229, to which condenser 228 is connected, is connected to the tap of a voltage divider 231 connected between a source of unidirectional potential 232 and ground. Its anode is connected through a load resistor 233 to the positive terminal of source 232 and is coupled by a condenser 234 to the control electrode of triode 230, in turn, connected to source 232 by a grid resistor 235. The cathodes of triodes 229 and 230 are grounded through a common cathode resistor 236 and the anode of triode 230 is connected via a resistor 237 and a relay coil 168 (Fig. 5) to a source 232. Coil 168 is shunted by a condenser 238.

Multivibrator 229—230 is arranged so that triode 230 is conductive in the absence of pulses at the grid of triode 229. Accordingly, a current may flow through relay coil 168 and the anode-cathode current path of this triode. However, in the presence of pulses, triode 229 is conductive and due to the anode current flow of triode 229 through cathode resistor 236, triode 230 is rendered non-conductive. Thus, as long as pulses are supplied by pulse generator 163 over leads 225 to triode 229, triode 230 is not conductive and relay coil 168 is not energized. If pulses from generator 163 do not occur over a time interval of preselected length, the charge condition of coupling condenser 234 is altered to the extent that conduction in triode 230 is initiated. Consequently, coil 168 is energized thereby meeting the requirements for integrator 167 of Fig. 5.

It may be desirable in the logging apparatus 100 to rectify the measured potential differences prior to transmitting them to the surface equipment. Thus, the potential appearing between leads 109 and 110 and between lead 110 and ground 115 may be unidirectional and could not be amplified by amplifiers 123 and 127 unless they are specially constructed for this type of operation. In order to permit the use of conventional amplifiers, the circuit of Fig. 8 may be employed in which unidirectional potentials are supplied over leads 109', 110' and between lead 110' and ground return 115'.

The first voltage is applied over terminals 120' to the fixed contacts 250, 251 of a single pole-double throw vibrator including a vibrating element 252 and actuating coils 253. Coils 253 are supplied with an alternating potential from a source 254 thereby causing vibrating element 252 to engage contacts 250 and 251 in alternation. Contact 252 is connected via a coupling condenser 255 to one end of the resistance element of a potentiometer 256, the other end of which is grounded. A connection between the wiper of potentiometer 256 and ground completes the input circuit to amplifier 123 (Fig. 5).

In a similar manner, the voltage occurring between lead 110' and ground 115' is applied via contacts 121' to the fixed contacts 257, 258 of another vibrator which includes a moving contact 259 that is acted upon by an energizing coil 260 supplied with an energizing signal from source 254. Its movable contact 259 is coupled by a condenser 261 to one end of the resistance element of another potentiometer 262, the other end of which is grounded. The input signal to amplifier 127 (Fig. 5) is derived between the movable contact of potentiometer 262 and ground.

In operation, the potential between electrode M and ground 115 is applied over lead 109', contact 250 and moving element 252 to potentiometer 256 during the operating intervals wherein the contact is in the up position. When the contact is in the down position, the potential between electrode M' and ground 115 is applied over lead 110', contact 251, and movable element 252 to the potentiometer. Thus, the input voltage to amplifier 123 is equal to the potential difference between electrodes M and M', but is chopped or interrupted at a rate determined by source 254. Therefore, an alternating potential having an amplitude representing the potential difference occurring between electrodes M and M' is applied to the input circuit of amplifier 123.

Referring now to vibrator 257—259, during the operating intervals in which vibrating element 259 is in the down position, the input to amplifier 127 is effectively grounded. During the operating intervals wherein it is in the up position, the input to the amplifier is connected to electrode M' via lead 110', contact 257, vibrating element 259 and condenser 261. Thus, an alternating potential is supplied to amplifier 127 which is dependent upon the amplitude of the potential appearing between the electrode M' and ground 115'.

Figure 8:
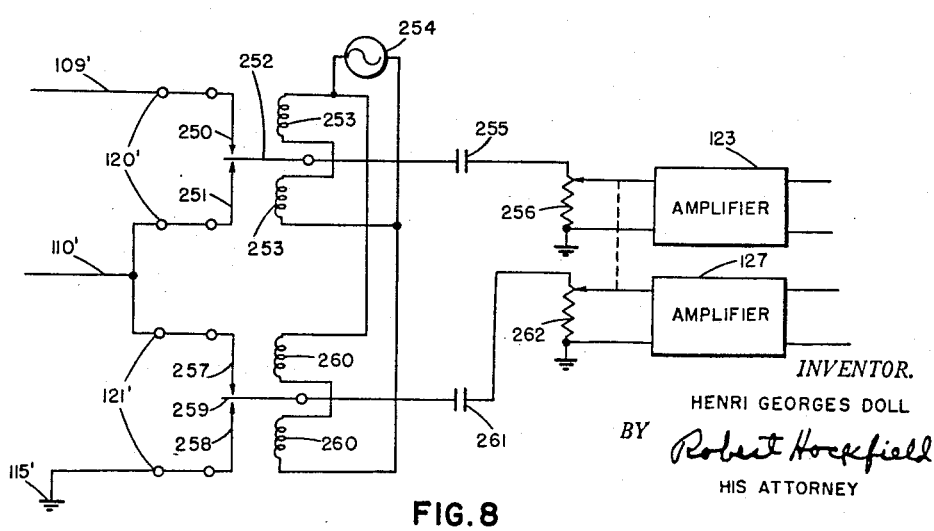
Fig. 8 is a circuit diagram of a modification which may be made in the electrical circuit between the well logging equipment and the computer illustrated in Fig. 5.

One of the advantages of the circuit represented in Fig. 8 is that there are no polarity requirements on the signals applied at the input terminals. That is, insofar as amplifier 123 is concerned, leads 109' and 110' may be interchanged without undesirably affecting the amplitude of the signal applied to this amplifier. This is important in associating the computer with electrical well logging apparatus because it provides a good deal of flexibility in the applications of the computer.

From the foregoing discussion, it is evident that the computing apparatus 101 shown in Fig. 5 is ideally suited for association with electrical well logging apparatus.

Obviously, information from types of logging apparatus, other than the one shown in Fig. 5, may be supplied to computer 101. Of course, by providing suitably inscribed screens, different factors may be computed. For example, true resistivity may be derived from information regarding apparent resistivity of formations traversed by a borehole.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. An automatic computer comprising: a screen including a general background area and a plurality of curves, said area and said curves having different effects on incident radiant energy; means for projecting radiant energy in a beam toward said screen; means for relatively and recurrently displacing said screen and said beam in a substantially fixed angular direction to scan a path along said screen and effect modulation of said beam; means for positioning said screen and said path with respect to one another in each of two directions according to the instantaneous values of respective ones of two variable quantities and thereby control said modulation of said beam; and means for deriving an electrical signal having a characteristic representing said modulation.

2. An automatic computer comprising: a screen including a general background area and a plurality of curves, said area and said curves having different effects on incident radiant energy; means for projecting radiant energy in a beam toward said screen; means for relatively and recurrently displacing said screen and said beam in a substantially fixed angular direction to scan a path along said screen intersecting a major number of said curves at relatively obtuse angles and effect modulation of said beam; means for positioning said screen and said path with respect to one another in each of two directions according to the instantaneous values of respective ones of two variable quantities and thereby control said modulation of said beam; and means for deriving an electrical signal having a characteristic representing said modulation.

3. An automatic computer comprising: a screen including a general background area and a plurality of curves, said area and said curves having different effects on incident radiant energy; means for projecting radiant energy in a beam toward said screen; means for relatively and recurrently displacing said screen and said beam in a substantially fixed angular direction to scan a path along said screen and effect modulation of said beam; means for positioning said screen and one extremity of said path with respect to one another in each of two directions according to the instantaneous values of respective ones of two variable quantities and thereby control said modulation of said beam, said path having an effective length sufficient to intercept all of said curves lying to one side of the instantaneous position of said extremity of said path in a direction parallel to said fixed angular direction; and means for deriving an electrical signal having a characteristic representing said modulation.

4. An automatic computer comprising: a screen including a general background area and a plurality of curves, said area and said curves having different effects on incident radiant energy; means for projecting radiant energy in a beam toward said screen; means for relatively and recurrently displacing said screen and said beam in a substantially fixed angular direction to scan a path along said screen and effect modulation of said beam into pulsations corresponding to the number of said curves intercepted by said beam; means for positioning said screen and said path with respect to one another in each of two directions according to the instantaneous values of respective ones of two variable quantities and thereby control the number of pulsations in said modulation of said beam; means for deriving an electrical potential having an amplitude representing the number of pulsations in said modulation occurring during each recurrent displacement of said screen and said beam; and means for indicating the amplitude of said electrical potential.

5. An automatic computer comprising: a screen including a general background area and a plurality of curves, said area and said curves having different effects on incident radiant energy and said curves occurring in a family representing successive values of a dependent variable $z$, plotted in rectangular coordinates of values of independent variables $x$ and $y$; means for projecting radiant energy in a beam toward said screen; means for relatively and recurrently displacing said screen and said beam in a substantially fixed angular direction parallel to the axis of one of said variables $x$ and $y$ to scan a path along said screen and effect modulation of said beam; means for positioning said screen and said path with respect to one another in each of two directions parallel to the axes of said variables $x$ and $y$ according to the instantaneous values of respective ones of said independent variables $x$ and $y$ and thereby control said modulation of said beam; and means for deriving an electrical signal having a characteristic representing said modulation to provide an indication of the instantaneous value of said dependent variable $z$.

6. An automatic computer comprising: a screen including a general background area and a plurality of curves, said area and said curves having different effects on incident radiant energy and said curves occurring in a family plotted in two coordinate scale values, at least one of which is non-linear; means for projecting radiant energy in a beam toward said screen; a deflection system for controlling the position of said beam relative to said screen; means coupled to said deflection system for recurrently displacing said beam in a substantially fixed angular direction to scan a path along said screen and effect modulation of said beam; means providing a pair of voltages each representing the instantaneous value of one of two independent variables; means including at least one non-linear circuit element for applying said voltages to said deflection system to position said screen and said path with respect to one another in each of two directions parallel to the axes of said scale values according to the instantaneous values of respective ones of two variable quantities and thereby control said modulation of said beam, one of said voltages being applied to said non-linear circuit element and the resulting output of said circuit element being applied to said deflection system so as to compensate substantially for said non-linear scale value; and means for deriving an electrical signal having a characteristic representing said modulation.

7. An automatic computer comprising: a principal screen including a general background area and a plurality of curves, said area and said curves having different effects on incident light energy; a cathode ray tube including a fluoroescent screen and means for projecting a beam of electrons toward said fluorescent screen to derive a beam of light energy projecting toward said principal screen; a deflection system associated with said cathode ray tube for controlling the position of the point of impingement of said beam of electrons on said fluorescent screen; means coupled to said deflection system for recurrently displacing said electron beam in a substantially fixed angular direction to scan said beam of light energy along a path on said principal screen and effect modulation of said light energy; means coupled to said deflection system for displacing said beam of electrons to position said path in each of two directions according to the instantaneous values of respective ones of two variable quantities and thereby control said modulation of said light energy; and means for deriving an electrical signal having a characteristic representing said modulation.

8. An automatic computer comprising: a principal screen including a general background area and a plurality of curves, said area and said curves having different effects on incident light energy; a cathode ray tube including a fluorescent screen and means for projecting a beam of electrons toward said fluorescent screen to derive a beam of light energy projecting toward said principal screen; a deflection system associated with said cathode ray tube for controlling the position of the point of impingement of said beam of electrons on said fluorescent screen; means coupled to said deflection system for recurrently displacing said electron beam in a substantially fixed angular direction to scan said beam of light energy along a path on said principal screen and effect modulation of said light energy into pulsations corresponding to the number of said curves intercepted by said beam of light energy; means coupled to said deflection system for displacing said beam of electrons to position one extremity of said path in each of two directions according to the instantaneous values of respective ones of two variable quantities and thereby control the number of pulsations in said modulation of said light energy; photoelectric means intercepting said beam of light energy after modulation by said principal screen for deriving a number of electrical pulses corresponding to the number of pulsations in said modulation of said light energy; an integrator electrically coupled to said photoelectric means for deriving a potential having an amplitude representing the number of pulsations in said modulation occurring during each recurrent displacement of said electron beam; and means for indicating the amplitude of said potential.

9. An automatic computer comprising: a principal screen including a general background area and a plurality of curves, said area and said curves having different light-transmitting effects on incident light energy and said curves occurring in a family representing successive values of a dependent variable $z$, plotted in rectangular coordinate values of independent variables $x$ and $y$; a cathode ray tube including a fluorescent screen and means for projecting a beam of electrons toward said fluorescent screen to derive a beam of light energy projecting in a beam toward said screen; a deflection system associated with said cathode ray tube for controlling the position of the point of impingement of said beam of electrons on said fluorescent screen; a sweep generator coupled to said deflection system for recurrently displacing said electron beam in a substantially fixed angular direction parallel to the axis of one of said variables $x$ and $y$ to scan said beam of light energy along a path on said principal screen and effect modulation of said light energy into pulsations corresponding to the number of said curves intercepted by said beam of light energy; means coupled to said deflection system for displacing said beam of electrons to position one extremity of said path in each of two directions parallel to the axes of said variables $x$ and $y$ according to the instantaneous values of respective ones of said variables $x$ and $y$ and thereby control said modulation of said beam; photoelectric means intercepting said beam of light energy after modulation by said principal screen for deriving a number of electrical pulses corresponding to the number of pulsations in said modulation of said light energy; an integrator electrically coupled to said photoelectric means for deriving a potential having an amplitude representing the number of pulsations in said modulation occurring during each recurrent displacement of said electron beam; and an output device electrically coupled to said integrator for indicating the amplitude of said potential thereby to provide an indication of the instantaneous value of said dependent variable z.

10. An automatic computer comprising: a screen including a general background area and a plurality of curves, said area and said curves having different effects on incident light energy; means for projecting light energy in a beam toward said screen; first electro-mechanical means for recurrently displacing said beam in a substantially fixed angular direction to scan a path along said screen and effect modulation of said beam; second electro-mechanical means for positioning said beam relative to said screen in each of two directions; means for applying control potentials to said second electro-mechanical means to position one extremity of said path of said beam on said screen in each of said two directions according to the instantaneous values of respective ones of two variable quantities and thereby control said modulation of said beam; and means for deriving an electrical signal having a characteristic representing said modulation.

11. An automatic computer comprising: a cathode ray tube including a screen having a general background area and a plurality of curves, said area and said curves having different effects on incident electrons, and said tube further including means for projecting electrons in a beam toward said screen; a deflection system associated with said cathode ray tube for controlling the position of the point of impingement of said beam on said screen; means coupled to said deflection system for recurrently displacing said beam in a substantially fixed angular direction to scan a path along said screen and effect modulation of said beam; means coupled to said deflection system for displacing said beam to position said path in each of two directions according to the instantaneous values of respective ones of two variable quantities and thereby control said modulation of said beam; and means for deriving an electrical signal having a characteristic representing said modulation.

12. A computing system comprising: a pair of automatic computers each including a screen having a general background area and a plurality of curves, said area and said curves having different effects on incident radiant energy, means for relatively and recurrently displacing said screen and said beam in a substantially fixed angular direction to scan a path along said screen and effect modulation of said beam, means for positioning said screen and said path with respect to one another in each of two directions according to the instantaneous values of respective ones of two variable quantities and thereby control said modulation of said beam, means for deriving an electrical signal having a characteristic representing said modulation, and an indicator coupled to said last-mentioned means for producing indications in response to said electrical signal; means responsive to a characteristic of said modulation of said beam of one of said automatic computers for deriving a control potential; and means for utilizing said control potential for conditioning the other of said automatic computers.

13. Apparatus for investigating earth formations traversed by a borehole comprising: equipment adapted to be passed through said borehole; means coupled to said equipment for deriving a pair of potentials each representing one of two characteristics of said formations; an automatic computer for utilizing said potentials including a screen having a general background area and a plurality of curves, said area and said curves having different effects on incident radiant energy, and said curves occurring in a family defining a third characteristic related to said formations plotted in terms of said first-mentioned characteristics, means for projecting radiant energy in a beam toward said screen, means for relatively and recurrently displacing said screen and said beam in a substantially fixed angular direction to scan a path along said screen and effect modulation of said beam, means for positioning said screen and said path with respect to one another in each of two directions according to the instantaneous values of respective ones of two variable quantities and thereby control said modulation of said beam, and means for deriving an electrical signal having an amplitude representing said modulation thereby to provide an indication of said third characteristic of said earth formations.

14. Apparatus for investigating earth formations traversed by a bore hole comprising: an electrode system adapted to be passed through said borehole; a source of electrical current coupled to said electrode system for causing an electrical current to flow into said formations; means coupled to said electrode system for deriving a pair of potentials each representing the electrical resistivity of said formations at respective, different depths of investigation; an automatic computer for utilizing said potentials including a screen having a general background area and a plurality of curves, said area and said curves having different effects on incident radiant energy and said curves occuring in a family defining a physical characteristic related to said formations plotted in terms of said electrical resistivity for each of said depths of investigation, means for projecting radiant energy in a beam toward said screen, means for relatively and recurrently displacing said screen and said beam in a substantially fixed angular direction to scan a path along said screen and effect modulation of said beam, means for positioning said screen and said path with respect to one another in each of two directions according to the instantaneous values of respective ones of two variable quantities and thereby control said modulation of said beam, and means for deriving an electrical signal having an amplitude representing said modulation thereby to provide an indication of said physical characteristic related to said formations.

15. Apparatus for investigating earth formations traversed by a borehole filled with a drilling mud and having a sidewall coated at least in part with a cake of said mud, said apparatus comprising: equipment adapted to be passed through said borehole; means coupled to said equipment for deriving a pair of potentials each representing one of two characteristics of said formations; a computing system including a pair of automatic computers each comprising a screen having a general background area and a plurality of curves, said area and said curves having different effects on incident radiant energy, said curves in one of said computers occurring in a family defining porosity of said formations plotted in terms of said first-mentioned characteristics and said curves in the other of said computers occurring in a family defining the thickness of the mud cake on said sidewall plotted in terms of said first-mentioned characteristics, means for projecting radiant energy in a beam toward said screen, means for relatively and recurrently displacing said screen and said beam in a substantially fixed angular direction to scan a path along said screen and effect modulation of said beam, means for positioning said screen and said path with respect to one another in each of two directions according to the instantaneous values of respective ones of two variable quantities and thereby control said modulation of said beam, means for deriving an electrical signal having an amplitude representing said modulation, and an indicator coupled to said last-mentioned means for producing indications of said porosity and said thickness of said mud cake; means responsive to a characteristic of said modulation of said beam in said other automatic computer corresponding to an indication of mud cake thickness less than a predetermined value for deriving a control potential; and means for utilizing said control potential for effectively disabling said indicator of said one automatic computer.

References Cited in the file of this patent

UNITED STATES PATENTS

| | | |
|---|---|---|
| 1,977,999 | Prinz | Oct. 23, 1934 |
| 2,412,467 | Morton | Dec. 10, 1946 |
| 2,415,190 | Rajchman | Feb. 4, 1947 |
| 2,463,362 | Doll | Mar. 1, 1949 |
| 2,497,042 | Doll | Feb. 7, 1950 |
| 2,643,819 | Lee et al. | June 30, 1953 |
| 2,669,690 | Doll | Feb. 16, 1954 |